US010422322B2

(12) United States Patent
Vanderwalker et al.

(10) Patent No.: US 10,422,322 B2
(45) Date of Patent: Sep. 24, 2019

(54) SYSTEM AND METHOD FOR REMOVING OR INSTALLING A MAIN SHAFT OF A WIND TURBINE WITH MAIN SHAFT SUPPORT ELEMENTS

(71) Applicant: General Electric Company, Schenectady, NY (US)

(72) Inventors: Darrick Adam Vanderwalker, Pattersonville, NY (US); Gregory Clarence Thomas, Saratoga Springs, NY (US); Hunter Ryan Anderson, Muskegon, MI (US); Waylon James Esser, Canova, SD (US)

(73) Assignee: General Electric Company, Schenectady, NY (US)

( * ) Notice: Subject to any disclaimer, the term of this patent is extended or adjusted under 35 U.S.C. 154(b) by 315 days.

(21) Appl. No.: 15/498,778

(22) Filed: Apr. 27, 2017

(65) Prior Publication Data

US 2018/0313330 A1 Nov. 1, 2018

(51) Int. Cl.
*F03D 13/10* (2016.01)
*F03D 80/50* (2016.01)

(52) U.S. Cl.
CPC .............. *F03D 80/50* (2016.05); *F03D 13/10* (2016.05); *F05B 2230/61* (2013.01); *F05B 2230/70* (2013.01); *F05B 2240/60* (2013.01); *Y02E 10/722* (2013.01)

(58) Field of Classification Search
CPC ........... F03D 13/00; F03D 13/10; F03D 80/50
See application file for complete search history.

(56) References Cited

U.S. PATENT DOCUMENTS

| 7,944,079 B1* | 5/2011 | Signore | F03D 15/00 290/55 |
|---|---|---|---|
| 9,624,902 B2* | 4/2017 | Westergaard | F03D 1/0666 |
| 9,757,821 B2* | 9/2017 | Thomas | B23B 5/08 |
| 2007/0193014 A1* | 8/2007 | Henley | B23P 19/022 29/428 |
| 2007/0200103 A1* | 8/2007 | Viladomiu i Guarro | B66C 23/207 254/334 |
| 2009/0159549 A1* | 6/2009 | Trede | B66C 1/108 212/270 |
| 2009/0261594 A1* | 10/2009 | Christensen | F03D 13/20 290/55 |
| 2010/0021278 A1* | 1/2010 | Stegemann | B66C 23/06 414/629 |
| 2010/0218508 A1* | 9/2010 | Brown | F01D 25/285 60/796 |
| 2011/0162194 A1* | 7/2011 | Sugimoto | B66C 9/02 29/592.1 |

(Continued)

FOREIGN PATENT DOCUMENTS

| EP | 1101934 A2 * | 5/2001 | .......... B66C 23/207 |
|---|---|---|---|
| EP | 1291521 A1 * | 3/2003 | .......... F03D 7/0268 |
| EP | 1677006 A2 * | 7/2006 | .......... B66C 23/207 |

Primary Examiner — Jason L Vaughan
(74) Attorney, Agent, or Firm — Dority & Manning, P.A.

(57) ABSTRACT

A method and system for removing or installing a main shaft and attached main bearing assembly of a wind turbine from a bedplate form an extension onto a downwind end of the main shaft with one or more support elements to support the mains shaft on a bearing unit as it is pulled or pushed into the bedplate.

18 Claims, 11 Drawing Sheets

(56) References Cited

U.S. PATENT DOCUMENTS

| | | | | |
|---|---|---|---|---|
| 2011/0200435 A1* | 8/2011 | Pedersen | ............... | F03D 80/50 416/146 R |
| 2012/0073134 A1* | 3/2012 | Bywaters | ............ | H02K 7/1838 29/889.1 |
| 2012/0131786 A1* | 5/2012 | Neumann | ............... | F03D 15/00 29/464 |
| 2012/0141292 A1* | 6/2012 | Signore | ................ | B66C 1/108 416/244 R |
| 2012/0217089 A1* | 8/2012 | Fenger | ................ | F03D 80/50 182/2.1 |
| 2014/0373353 A1* | 12/2014 | Westergaard | ........... | F03D 80/70 29/889 |
| 2015/0026979 A1* | 1/2015 | Muller | ................ | B25B 27/06 29/889.1 |
| 2015/0096174 A1* | 4/2015 | Lohan | ................ | F16C 33/60 29/889.1 |
| 2015/0132119 A1* | 5/2015 | Fenger | ................ | F03D 80/50 415/201 |
| 2015/0135534 A1* | 5/2015 | Viscome | ............... | F03D 13/10 29/889 |
| 2016/0131105 A1* | 5/2016 | Westergaard | ........... | F03D 15/00 29/468 |
| 2017/0211547 A1* | 7/2017 | Thomas | ................ | F03D 13/10 |
| 2017/0306930 A1* | 10/2017 | Fenger | ................ | F03D 80/70 |

\* cited by examiner

SYSTEM AND METHOD FOR REMOVING OR INSTALLING A MAIN SHAFT OF A WIND TURBINE WITH MAIN SHAFT SUPPORT ELEMENTS

FIELD OF THE INVENTION

The present disclosure relates generally to wind turbines, and more particularly to systems and methods for removing and/or installing a main shaft to and from a nacelle located atop a wind turbine tower.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. In many wind turbines, the gearbox is mounted to the bedplate via one or more torque supports or arms. The rotor blades capture kinetic energy of wind using known airfoil principles and transmit the kinetic energy in the form of rotational energy so as to turn a main shaft coupling the rotor blades to the gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to an electrical generator. The wind turns the turbine blades, which spin a low speed shaft, i.e. the main shaft. The main shaft is coupled to an input shaft of a gearbox, which has a higher speed output shaft connected to a generator. Thus, the geared drivetrain aims to increase the velocity of the mechanical motion. Further, the gearbox and the generator are typically supported by one or more bearings and mounted to the bedplate via one or more torque arms or supports.

Over time, the main shaft and associated bearings may become worn and/or damaged due to loads and forces from the wind acting on the wind turbine components. Unfortunately, repair of the main shaft and/or the main bearing assembly often requires the turbine head (machine head) to be removed from atop the nacelle and transported to a factory wherein the bedplate is stood up vertically to remove the main shaft and bearing assembly, which is a very time-consuming and expensive procedure.

U.S. Pat. No. 8,696,302 discloses a method for repairing or replacing a main bearing on a wind turbine without removing the rotor and main shaft. This method is not suited for wind turbine designs wherein bearing replacement or repair requires removal of the rotor and main shaft.

U.S. Pat. No. 8,108,997 discloses a method for stabilizing the main shaft within the bedplate on a single bearing unit to repair or replace the gear box. This method is not suited for a procedure that requires removal of the rotor and main shaft to replace or repair the main bearing assembly.

To date, there has been no viable method for repairing, replacing, or upgrading a dual main bearing unit seated in a bedplate uptower in the field wherein the procedure requires removal of the rotor and main shaft from the bedplate.

Thus, the industry is in need of new and improved systems and methods for repairing, replacing, or upgrading the main shaft bearing seated in the bedplate of the wind turbine in the field, wherein the bedplate remains installed in a horizontal position atop the tower, or is removed from the tower in the field.

BRIEF DESCRIPTION OF THE INVENTION

Aspects and advantages of the invention will be set forth in part in the following description, or may be obvious from the description, or may be learned through practice of the invention.

In one aspect, the present invention is directed to a system and method wherein a support structure is formed on the downwind end of the main shaft to facilitate pulling or pushing of the main shaft into our out of the bedplate In this regard, a method is provided for removing an installed main shaft and attached main bearing assembly of a wind turbine from a bedplate in the field, wherein a rotor has been removed from the main shaft, a downwind end of the main shaft has been disconnected from a gearbox, and the gearbox has been removed from the bedplate. The method includes forming an extension onto a downwind end of the main shaft. The upwind end of the main shaft is supported with a rigging system and crane while the downwind end is pushed at least partway through the bedplate. During these steps, the main shaft at the downwind end is supported by the extension on a bearing unit fixed in the bedplate and the main shaft at the upwind end is supported by the rigging system. With the crane, the main shaft is supported to unload the bearing unit and slide the main shaft until the downwind end is free of the bearing unit. Then, with the crane fully supporting the main shaft, the main shaft is horizontally slid out from the bedplate.

In a particular embodiment, the extension is formed by fitting one or more support elements onto the main shaft at the downwind end of the main shaft.

The one or more support elements may be fitted onto a reduced diameter section of the main shaft adjacent the downwind end of the main shaft.

The support elements may include at least one full or partial cylindrical ring member slid or fitted onto the reduced diameter section of the main shaft. For example, a plurality of the ring members may be slid or fitted onto the reduced diameter section of the main shaft.

The ring member may have a tapered inner diameter at an end thereof that matches a taper on the main shaft that defines the reduced diameter section of the main shaft.

In an embodiment, the method may include attaching an end support element onto the downwind end of the main shaft to extend the extension axially beyond the downwind end of the main shaft.

In certain embodiments, the support element may be an end-cap element having an end ring section that extends the cylindrical extension axially beyond the downwind end of the main shaft and a cylindrical wall section that slides onto the main shaft, for example onto a reduced diameter section of the main shaft adjacent to the downwind end of the main shaft.

The invention also encompasses a method for installing a main shaft and attached main bearing assembly for a wind turbine in a bedplate in the field, wherein a gearbox has been removed from the bedplate. This installation method includes forming an extension onto a downwind end of the main shaft intended to be installed. A rigging system is connected to an upwind end of the main shaft, the rigging system suspended from a crane. With the crane, the main shaft is fully supported and moved through the bedplate until the extension is positioned at a bearing unit fixed in the bedplate. The load at the downwind end of the main shaft is then transferred to the extension and bearing unit. The downwind end of the main shaft is then pulled until the main bearing assembly is seated in the bedplate. The rigging system is then removed from the upwind end of the main shaft.

The methods for forming the extension onto the main shaft discussed above are applicable to the installation method as well.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
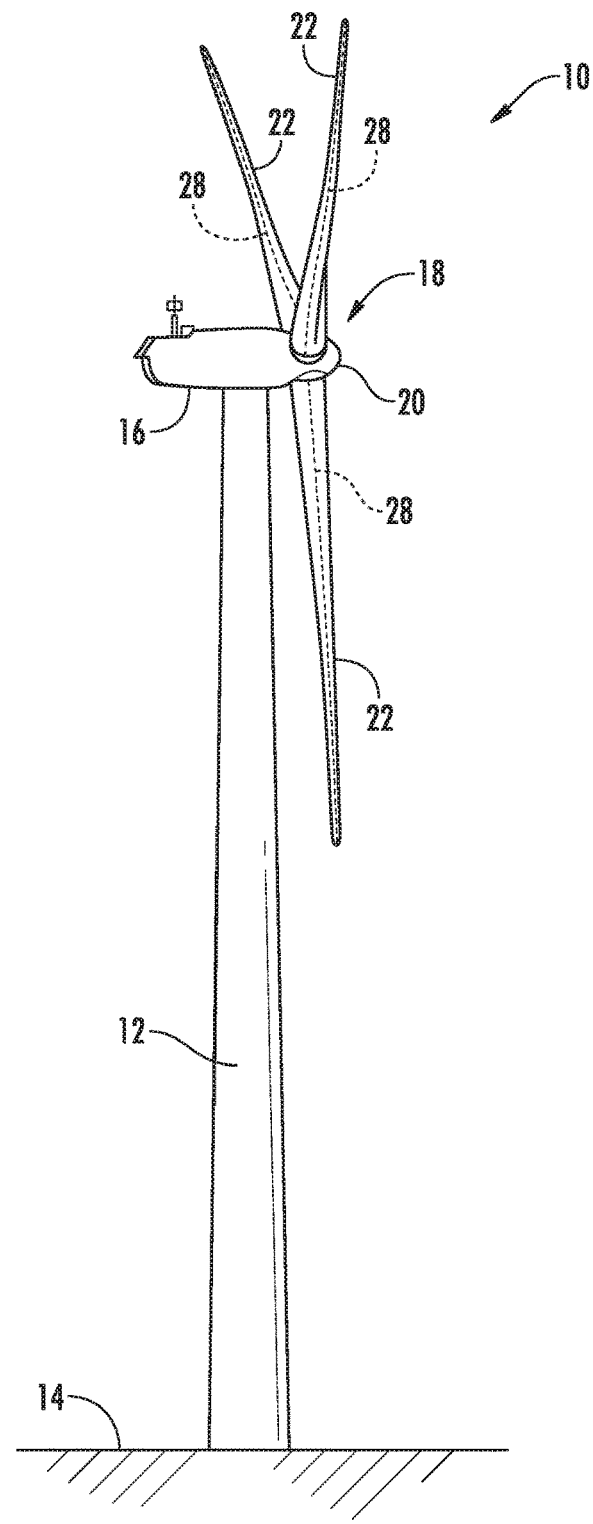
FIG. 1 is a perspective view of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present invention is directed to methods for installation and/or removal of the main shaft (with attached main bearing assembly) from a bedplate (e.g., a single piece forged bedplate) in the field, wherein the nacelle (machine head) remains atop the tower or is removed from the tower for servicing at ground level in the field. The methods provide significant commercial advantages in terms of time and expense for maintenance procedures that require removal of the main shaft from the machine head, such as repair/replacement of the main bearing assembly fitted on the shaft. Aspects of the present inventive methods are described below with reference to the drawings.

Referring now to the drawings, FIG. 1 illustrates a perspective view of one embodiment of a wind turbine 10 relevant to the present discussion. As shown, the wind turbine 10 generally includes a tower 12 extending from a support surface 14, a nacelle 16 (also referred to as a machine head) mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components thereof. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals and/or performing the various method steps as described herein.

Figure 2:
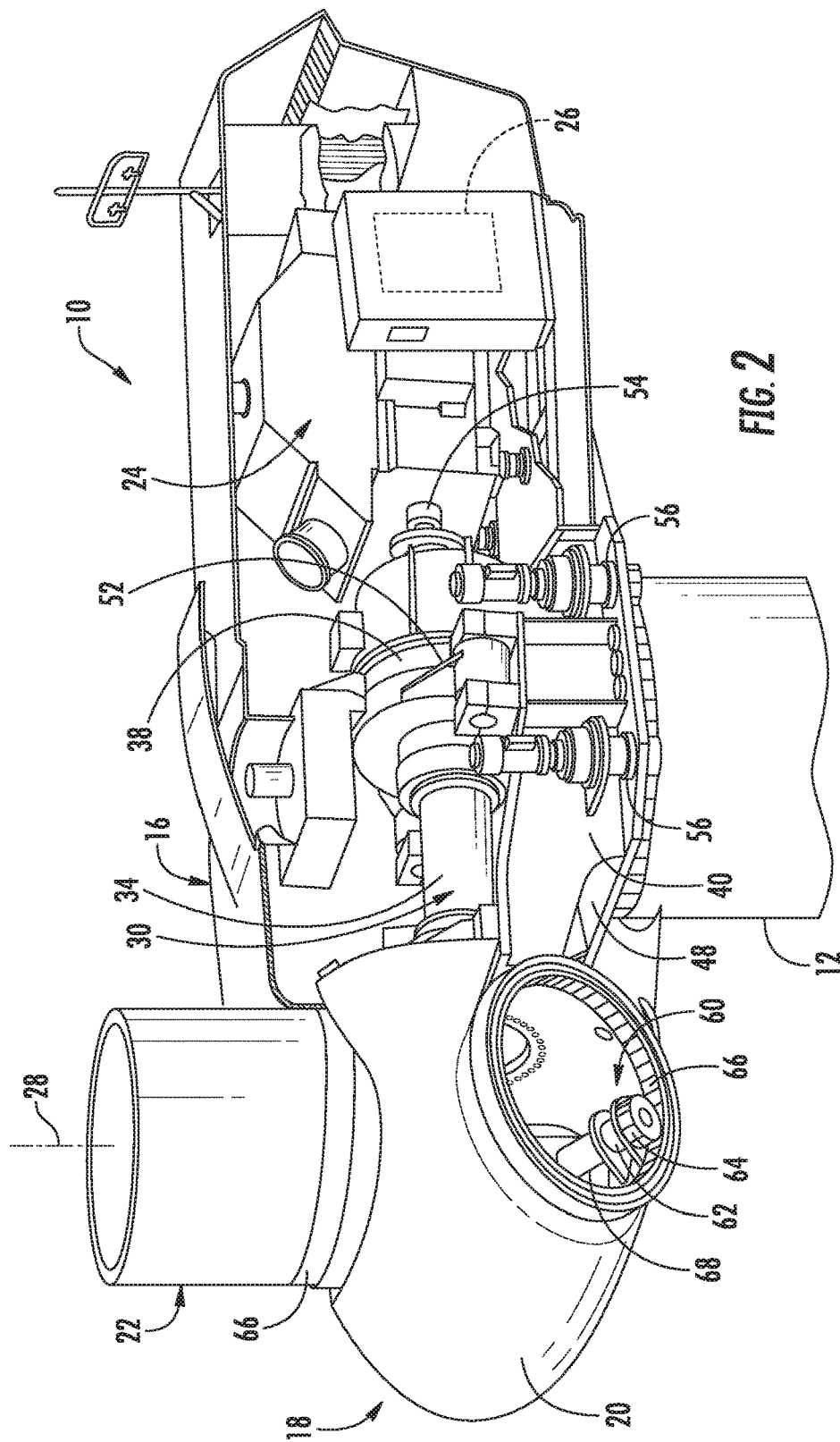
FIG. 2 is a perspective view of a simplified, internal view of one embodiment of a nacelle of a conventional wind turbine.

Referring now to FIG. 2, a simplified, internal view of one embodiment of the nacelle 16 shown in FIG. 1 is illustrated, particularly illustrating the drivetrain assembly 30. As shown, the drivetrain assembly 30 includes the generator 24, which may be coupled to the rotor 18 for producing electrical power from the rotational energy generated by the rotor 18. The rotor 18 includes a main shaft 34 coupled to the hub 20 via a rotor flange 36 for rotation therewith. The main shaft 34, in turn, is rotatably coupled to a generator shaft 54 of the generator 24 through a gearbox 38 connected to a bedplate support frame 40 by torque support arms 52. The bedplate 40 is depicted in the figures, for illustrative purposes, as a single-piece bedplate made from one complete casting with bores machined therein where the bearings are seated. The present invention may also have utility with a two-piece bedplate that is split horizontally, particularly if the invention offers a time and expense advantage as compared to unbolting the split bedplate and lifting the main shaft and bearings from the bottom half of the bedplate.

Figure 3:
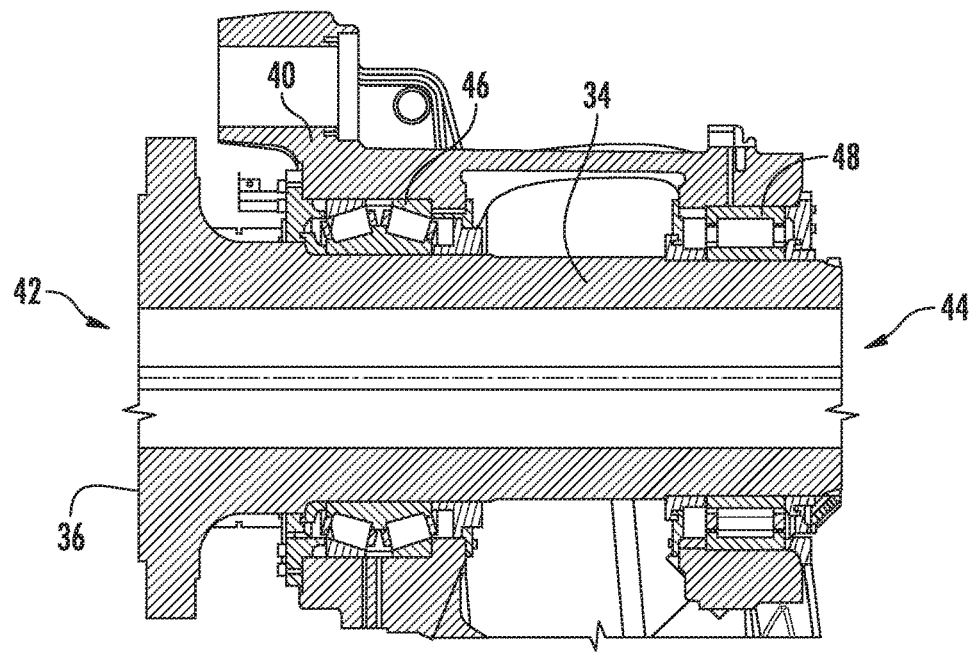
FIG. 3 is a perspective view of one embodiment of a drivetrain assembly particularly illustrating the main shaft and main bearing assembly.
Figure 9:
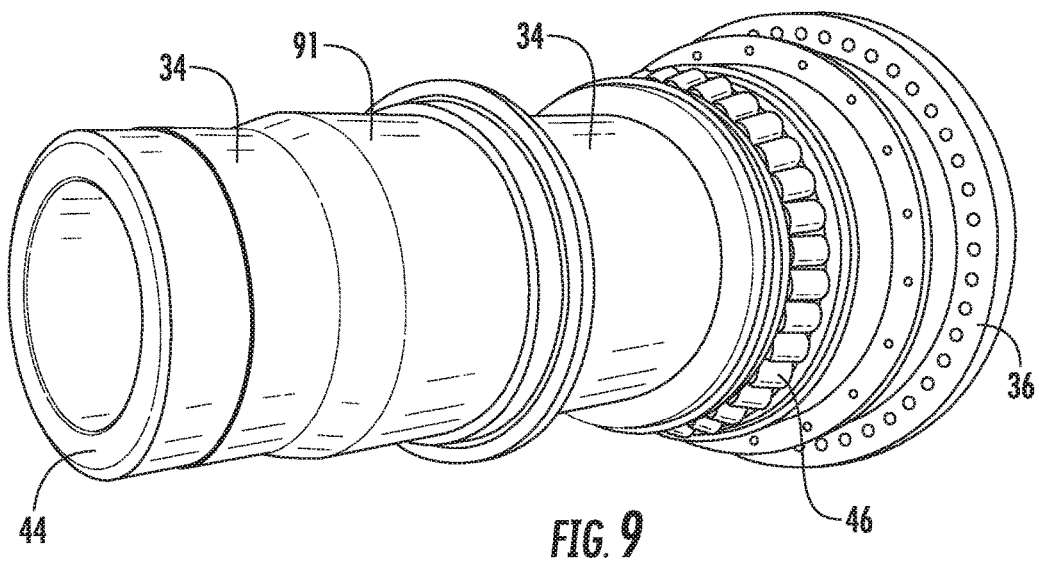
FIG. 9 is a perspective view of a main shaft prior to installation of support elements thereon.
Figure 10:
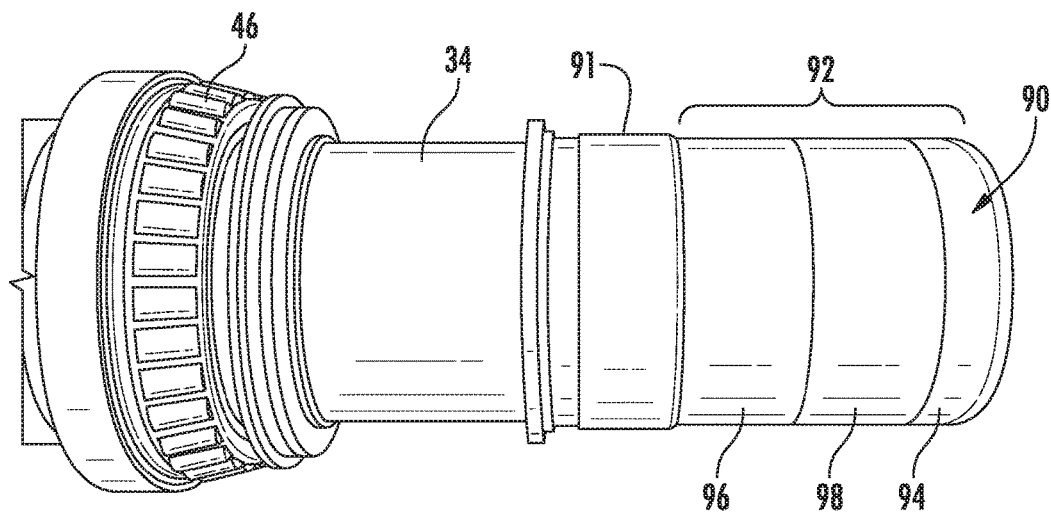
FIG. 10 is a perspective view of the main shaft of FIG. 9 with the support elements installed on the downwind end thereof.

Referring to FIG. 3, the main shaft 34 is supported by one or more bearing assemblies 46, 48. For example, as shown, a forward "upwind" end 42 of the shaft 36 is supported by the main bearing assembly 46, which in this particular embodiment is depicted as a double taper-roller bearing (TRB) assembly (the main bearing assembly 46 in the embodiment of FIGS. 9 and 10 is a single taper-roller bearing). This main bearing assembly 46 is fitted onto the main shaft 36 and can only be replaced or repaired by pulling the main shaft 34 from the bedplate 40. The aft "downwind" end 44 of the main shaft 36 is supported by the bearing unit 48, which in this particular embodiment is depicted as a cylindrical roller bearing (CRB) assembly. The CRB assembly 48 is mounted to the bedplate 40, and the shaft is able to be slid axially through this bearing 48 upon being pulled from the bedplate 40.

As is generally understood, the main shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 60 configured to rotate each rotor blade 22 about its pitch axis 28. Further, each pitch adjustment mechanism 60 may include a pitch drive motor 68 (e.g., any suitable electric, hydraulic, or pneumatic motor), a pitch drive gearbox 62, and a pitch drive pinion 64. The pitch drive motor 68 is coupled to the pitch drive gearbox 62 to impart a mechanical force to the pitch drive gearbox 62. Similarly, the pitch drive gearbox 62 is coupled to the pitch drive pinion 64 for rotation therewith. The pitch drive pinion 64 is in rotational engagement with a pitch bearing 66 coupled between the hub 20 and a corresponding rotor blade 22 such that rotation of the pitch drive pinion 64 causes rotation of the pitch bearing 66, thereby rotating the rotor blade 22 about the pitch axis 28. Similarly, the wind turbine 10 may include one or more yaw drive mechanisms 56 communicatively coupled to the controller 26, with each yaw drive mechanism(s) 56 being configured to change the angle of the nacelle 16 relative to the wind (e.g., by engaging a yaw bearing 58 of the wind turbine 10).

Figure 19:
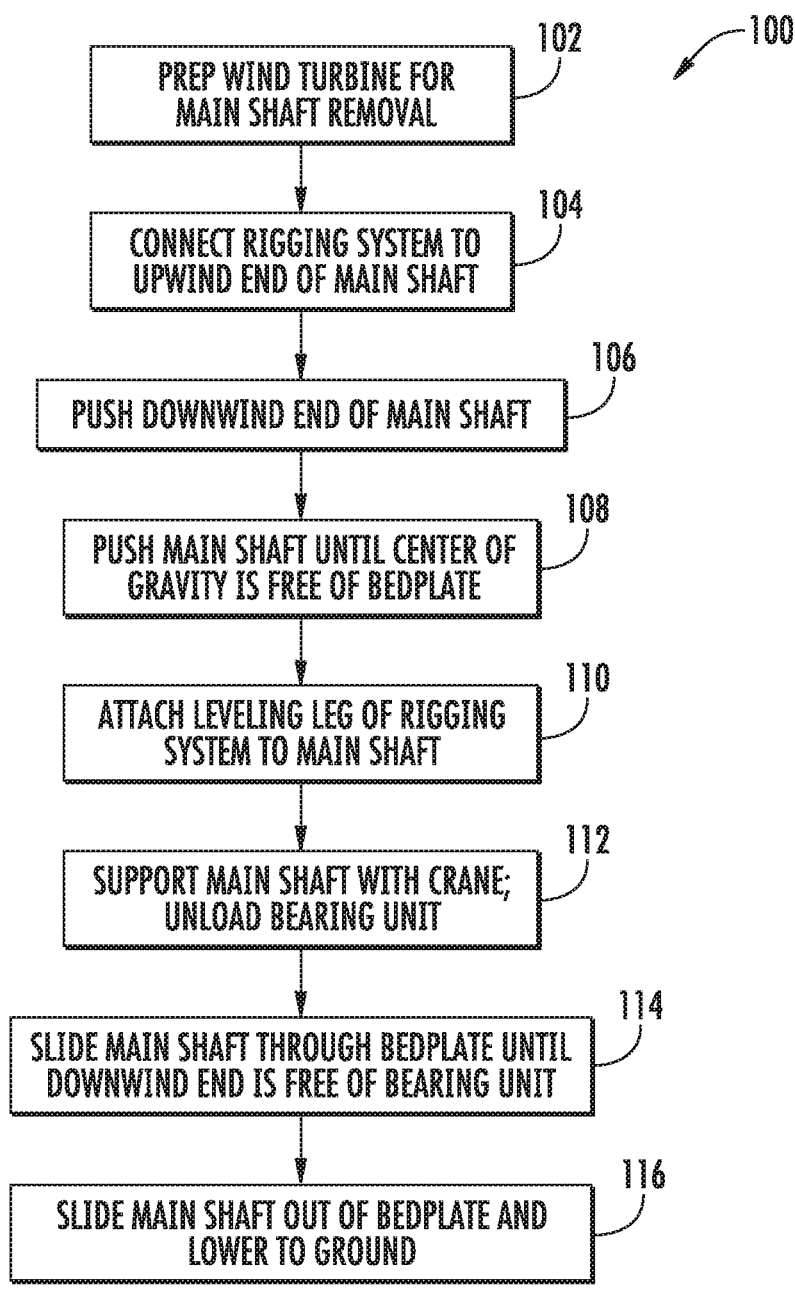
FIG. 19 is a flow chart of a method embodiment for removal of the main shaft from the wind turbine bedplate.

FIG. 19 provides a flowchart representation of a method embodiment 100 in accordance with the present invention for removing an installed main shaft 34 and attached main bearing assembly 46 from the bedplate 40 in the field with the nacelle 16 remaining attached to the tower 12, or removed from the tower and placed at ground level for servicing. Step 102 involves preparing the wind turbine 10 for removal of the main shaft 34. This may include any one or combination of removing the blades 22 and rotor hub 20, removing various panels/wall of the nacelle 16 to expose the bedplate 40, removing the generator 24, removing the gearbox 38, arranging a crane 78 (FIG. 8) at the site, staging a rigging system 70, and any other preparatory step or procedure that is necessitated by the wind turbine design or site location for a subsequent removal of the main shaft 34. Although it may be desired for space and safety concerns, the method 100 may be practiced without removing the generator 24 in certain wind turbine designs.

At step 104, part of the rigging system 70 is connected to the upwind end 44 of the main shaft 34. For example, referring to FIG. 4, the rigging system 70 may include multiple "legs" 72, 74 in the form of chains, cables, webbing, slings, and the like, attachable to a cable on the crane 78 by any suitable conventional means (e.g., a turnbuckle). One or more of these legs 72, 74 are connected to the upwind end 42 in a manner sufficient for the crane to support the full load of the upwind end 42 without the upwind end 42 rolling. In the depicted embodiment, the first leg 72 and second leg 74 are connected (e.g., using turnbuckles or other suitable devices) to preexisting holes in the rotor flange 36 at upper, opposite sides of the flange 36.

Once the rigging is connected to the crane cable and the upwind end 42 of the main shaft 34 is supported, step 106 involves pushing the downwind end 44 of the main shaft 34 at least partway through the bedplate 40. This "pushing" may be accomplished by electrical, hydraulic, pneumatic, or electro/hydraulic motive means. In the embodiment of FIGS. 15-18, a hydraulic ram assembly 82 is configured at the downwind end 44 for this purpose, as explained in greater detail below.

Figure 5:
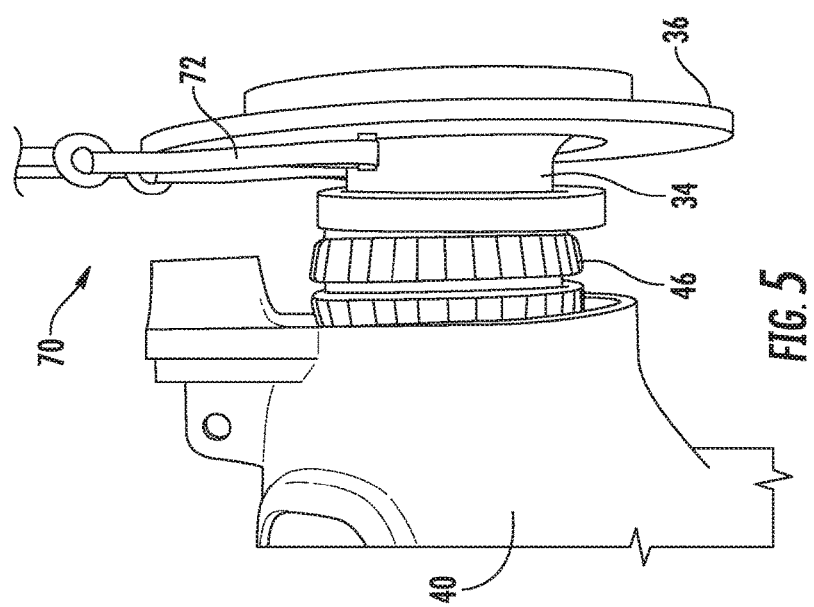
FIG. 5 is a perspective view of additional steps for pulling the main shaft from the wind turbine bedplate.
Figure 7:
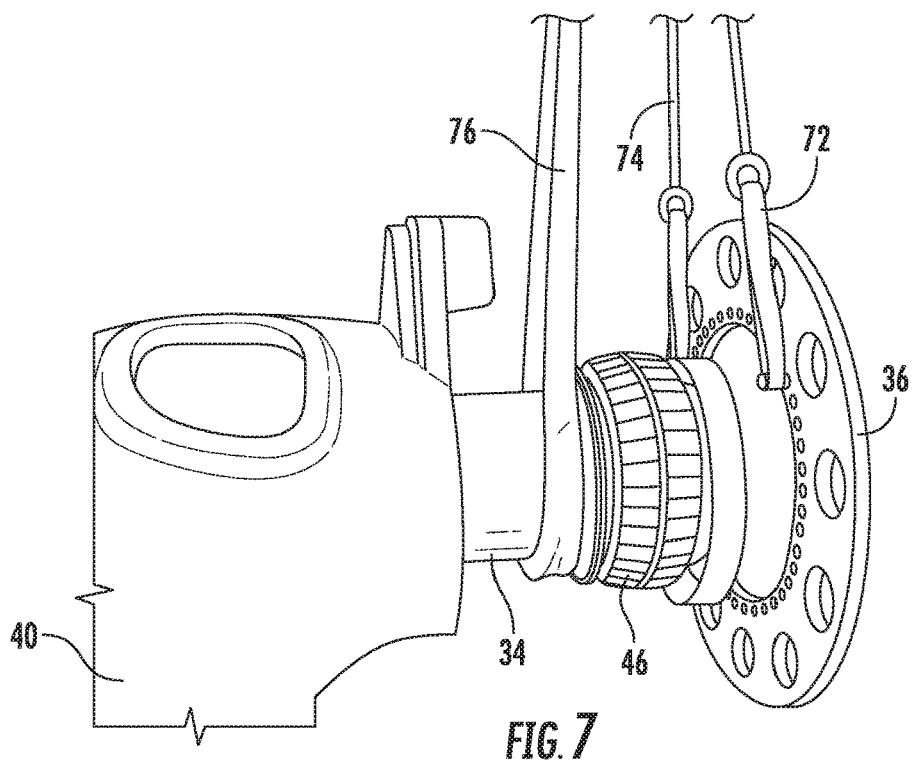
FIG. 7 is a perspective view of additional steps for pulling the main shaft from the wind turbine bedplate.

FIG. 5 depicts the upwind end 42 of the main shaft 34 being pushed out of the bedplate 40 to the extent that the main bearing assembly 46 (e.g., the TRB assembly) has been unseated and is partially out of the bedplate 40.

Figure 6:
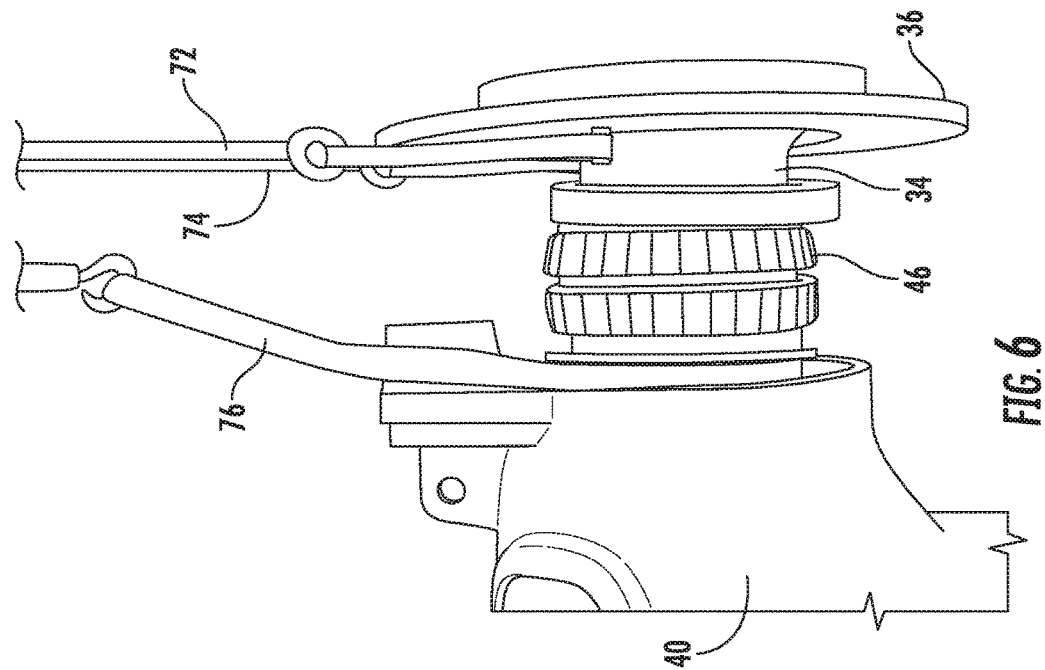
FIG. 6 is a perspective view of still further steps for pulling the main shaft from the wind turbine bedplate.

At step 108, the main shaft 34 is slid through the bedplate 40 at least until a center of gravity of the main shaft 34 and main bearing assembly 46 are free of the bedplate 40, as depicted in FIG. 6. The axial location of the center of gravity is predefined and will vary depending on the size of the mains shaft, the main bearing assembly, materials, and so forth.

Figure 8:
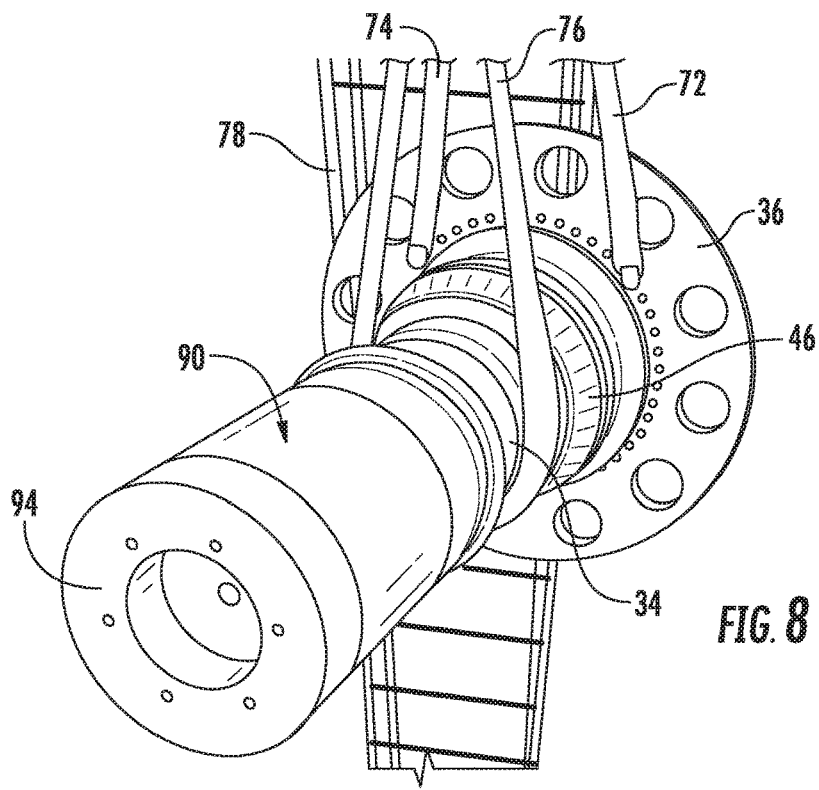
FIG. 8 is a perspective view of the main shaft removed from the bedplate and supported by a crane.

At step 110, a "leveling" leg 76 of the rigging system 70 is attached to the main shaft 34 at a location such that the center of gravity is located between the leveling leg 76 and the first and second legs 72, 74 of the rigging system 70. The leveling leg 76 is preferably adjustable (manually or remotely) for balancing the main shaft 34. In this manner, the main shaft 34 can be balanced and eventually fully supported by the crane 70 in an essentially horizontal orientation (FIG. 8). In the depicted embodiment, the leveling leg 76 is depicted as an adjustable sling or cradle that wraps around the main shaft 34. Any suitable rigging device that supports the main shaft at the desired axial location may be used for this purpose.

At step 112, with the crane 70, the main shaft 34 is fully supported to unload the bearing unit 48 at the upwind side 42 of the bedplate. The main shaft 34 can then be slid completely out of the bedplate 40 with the crane 78 (step 114), until the downwind end is free of the bearing unit 48, as depicted for example in FIG. 8. The main shaft 34 and main bearing assembly 46 are supported by the rigging system in a horizontal and balanced orientation during this process.

At this point, at step 116, the main shaft 34 and attached main bearing assembly 46 can be lowered to the ground, at which time repair/replacement of the main bearing assembly 46 can be done.

With certain main shaft designs, it may be desired to increase the effective length of the downwind end 44 of the main shaft 34 to ensure that the downwind end is supported by the bearing unit 48 at least until the center of gravity of the main shaft 34 and bearing assembly 46 are free of the upwind end 42 of the bedplate 40. Referring to the view in FIG. 8, this may be accomplished by essentially adding extension or support elements 90 to the end of the main shaft 34 in order to extend the cylindrical length of the shaft, as explained in more detail below with reference to FIGS. 9 through 14.

Figure 20:
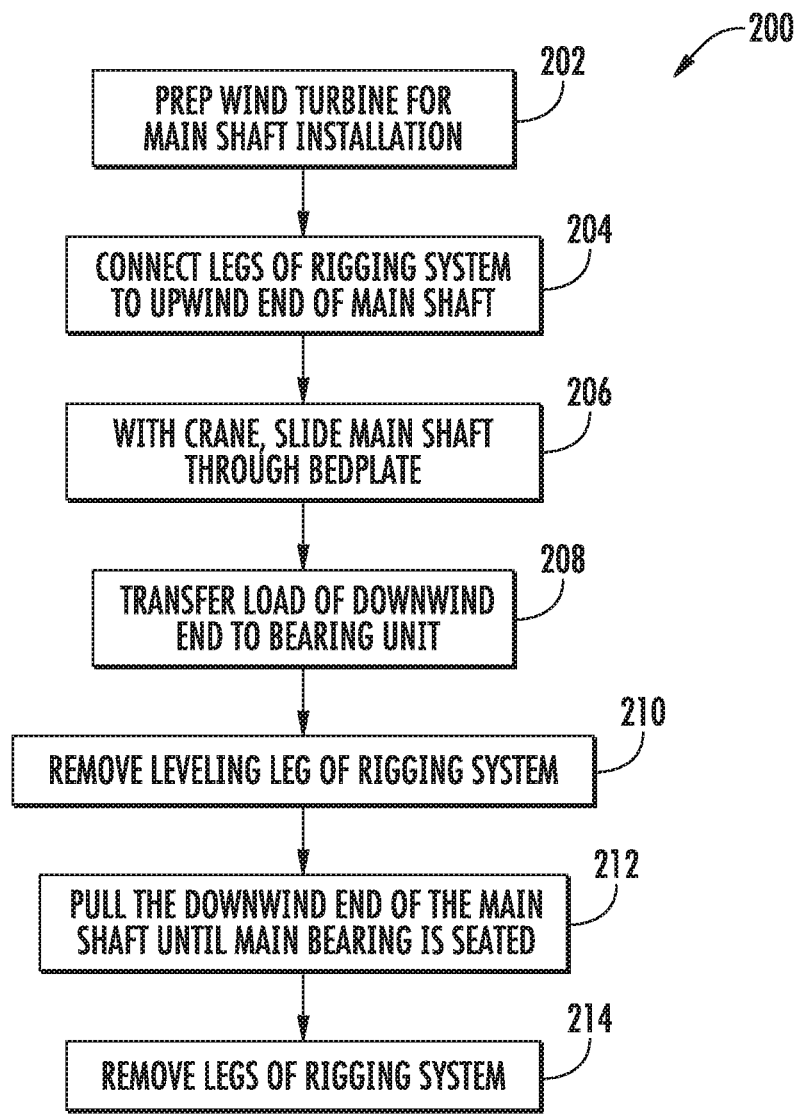
FIG. 20 is a flow chart of a method embodiment for installation of the main shaft in the wind turbine bedplate.

Referring to FIG. 20, the present invention also encompasses a method 200 for installing a main shaft 34 and attached main bearing assembly 46 for a wind turbine 10 in a bedplate 40 installed atop a wind turbine tower 12 in the field, wherein a gearbox 38 has been removed from the bedplate 40. The installation method 200 is essentially the reverse of the removal method 100.

At step 202, necessary preparations are made to the wind turbine for the installation.

At step 204, at least a first leg 72 of the rigging system 70 is connected to the upwind end 42 of the main shaft 34, which may be at ground level. The leveling leg 76 of the rigging system 70 is connected to the main shaft 34 at a location such that a center of gravity of the main shaft 34 and bearing assembly 46 is located between the leveling leg 76 and the first/second legs 72, 74 of the rigging system 70. If not yet done, the rigging system 70 is connected to the crane cable, and the main shaft 34 is raised in a balanced, horizontal orientation.

At step 206, with the crane 78 fully supporting the main shaft 34, the main shaft 34 is slid through the bedplate until the downwind end 44 of the main shaft is positioned at the bearing unit 48 fixed in the bedplate 40.

At step 208, the load of the downwind end 44 is transferred to the bearing unit, and at step 210, the leveling leg 76 is removed from the main shaft 34 so that the mains shaft can be pulled into the bedplate 40.

At step 212, the downwind end 44 is "pulled" to further slide the main shaft into the bedplate 40 until the main bearing assembly 46 is seated. The pull system hydraulic ram assembly 82 discussed above, or other pull system means, can be operated in reverse for this purpose, or any other suitable electrical, hydraulic, or electric/hydraulic system may be used for this purpose.

At step 214, the remaining legs 72, 74 of the rigging system 70 can be removed from the main shaft 70. The shaft can be slide further into the bedplate 40 with the hydraulic ram assembly 82 if needed.

As discussed, the effective length of the downwind end 44 of the main shaft 34 may be increased, for example by the addition of the support elements 90, to ensure that the downwind end 44 is supported by the bearing unit 48 prior to pulling the downwind end 44 of the main shaft 34.

Figure 15:
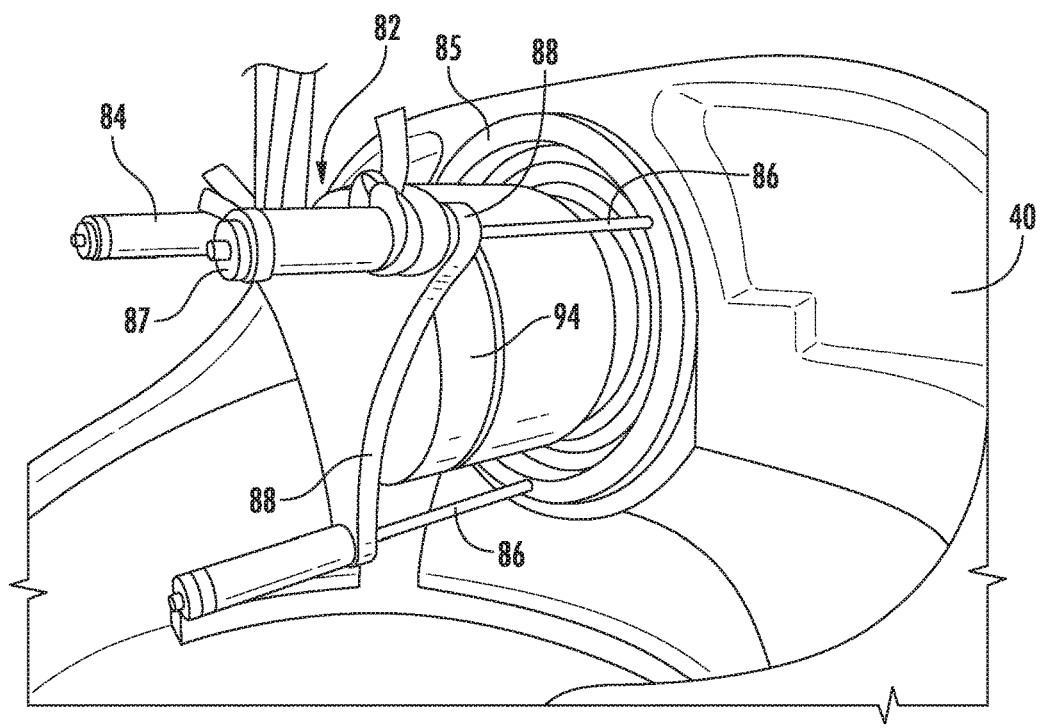
FIG. 15 is a perspective view of a hydraulic ram assembly in a push configuration for pushing the downwind end of the main shaft through the bedplate.

Operation of one embodiment for pushing the main shaft 34 from the downwind end 44 thereof in the removal method 100, and pulling the main shaft 34 at the downwind end 44 in the installation method 220, is depicted in FIGS. 15 through 18, in which FIG. 15 depicts the hydraulic ram assembly 82 in a "push" configuration. Initially, a specifically designed ring or partial arc component 85 is mounted to the bedplate 40 around the main shaft 34 at the downwind end 44. A plurality of rods 86 (depending on the number of hydraulic cylinders used) are threaded into this ring at equally circumferentially spaced locations. These rods 86 may be threaded along the length thereof. In the depicted embodiment, three rods 86 are spaced around the ring 85. A plate 88 is designed with holes corresponding to the locations of the rods 86 on the ring 85, wherein the plate is slidable onto the rods 86. The plate 88 can have any shape, such as circular. In the depicted embodiment, the plate 88 is star-shaped with an arm at leach of the rod 86 locations.

Referring to FIGS. 15 through 18, a hydraulic cylinder 84 is mounted on the plate 88 at each hole location. In the depicted embodiment, the hydraulic cylinders 84 are single acting "hollow" cylinders and mounted on the plate 88 such that a ram 87 of each cylinder 84 moves in a direction away from the plate 88 when actuated. At each location, the rod 86 runs through the cylinder 84 and ram 87. Suitable hydraulic cylinders 84 are commercially available from different manufacturers, including ENERPAC.

Figure 16:
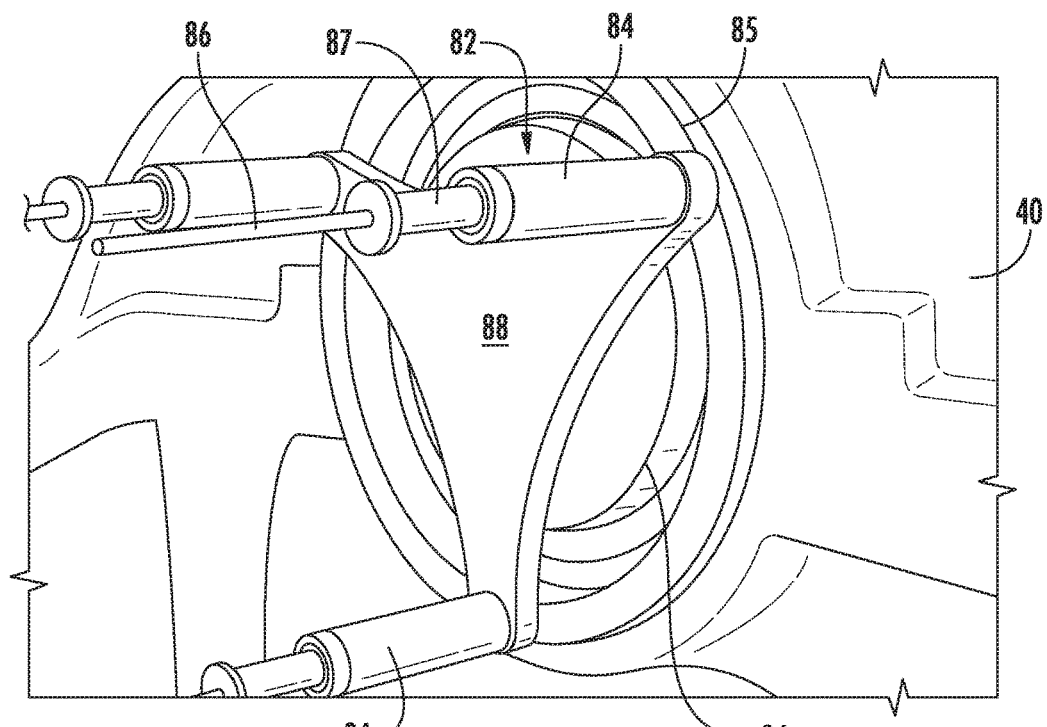
FIG. 16 is a perspective view of the hydraulic ram assembly of FIG. 15 at the end of its push stroke.

In the push configuration of FIGS. 15 and 16, the plate 88 and hydraulic cylinders 84 are slid onto the rods 86 such that the plate 88 bears against the downwind end 44 of the main shaft 34 or an end support ring 94 (discussed below) attached to the end of the main shaft 34. The position of the rams 87 on the rods 86 is locked in place by a nut threaded onto the rods 86 against which the rams 87 bear upon actuation of the cylinders 84. Other locking devices on the rods 86 can be used for this purpose. FIG. 15 depicts an initial position of the hydraulic ram assembly 82 in the push configuration, and FIG. 16 depicts a final position wherein the plate 88 has "bottomed out" against the ring 85 and the main shaft 34 has been pushed into the bedplate 40. The push stroke of the hydraulic cylinders 84 is thus equal to effective displacement distance of the rams 87. Prior to downwind end 44 of the main shaft 34 reaching the position depicted in FIG. 16, the main bearing assembly 46 has unseated from the bedplate 40 and the leveling leg 76 of the rigging system has been attached to the main shaft, as depicted in FIG. 6.

Figure 17:
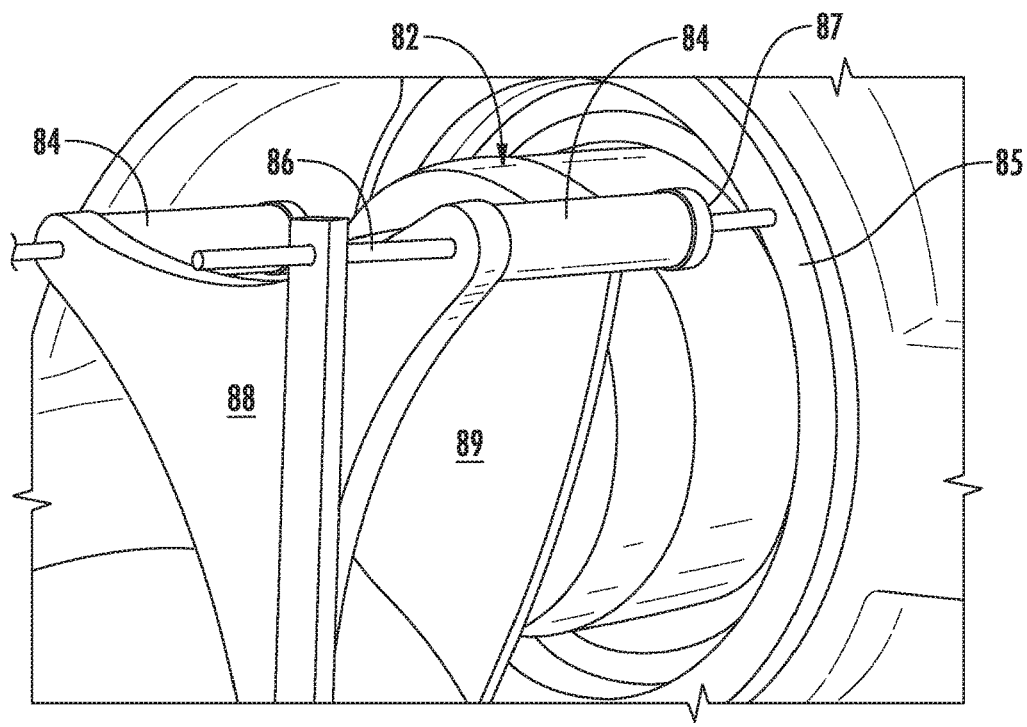
FIG. 17 is a perspective view of the hydraulic ram assembly in a pull configuration for pulling the downwind end of the main shaft into the bedplate.

FIG. 17 depicts the hydraulic ram assembly 82 configured in a "pull" configuration for pulling the downwind end 44 of the main shaft through the bedplate 40 for the installation method 220 described above. In the depicted embodiment, the hydraulic rams 84 are single action rams as discussed above. Thus, in the pull configuration, the orientation of the plate 88 and hydraulic cylinders 84 on the rods 86 is reversed as compared to FIG. 15 such that the rams 87 act against the ring 85 and the hydraulic cylinders 84 (and attached plate 88) are locked in position by stops (e.g., nuts) on the rods 86. An inner plate 89 (a "pull" plate) may be fixed to the downwind end 44 of the main shaft 34 (or end support ring 94) to provide a better surface for fixing the plate 88 relative to the main shaft 34.

Figure 4:
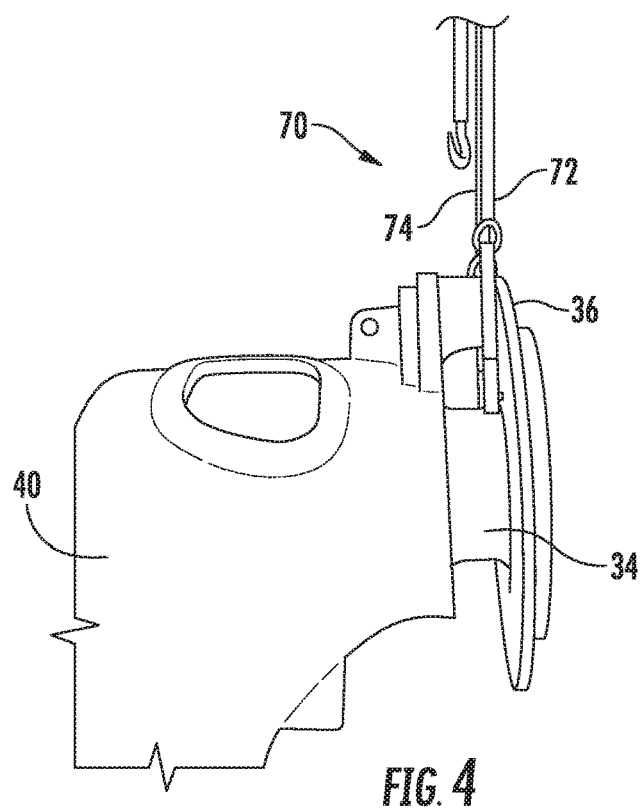
FIG. 4 is a perspective view of initial steps for pulling the main shaft from the wind turbine bedplate in accordance with aspects of the invention.
Figure 18:
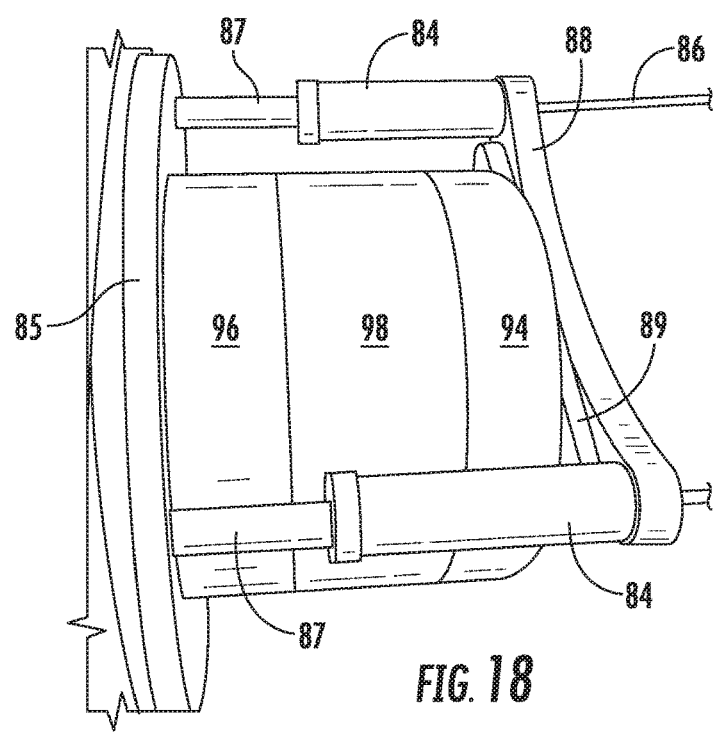
FIG. 18 is a perspective view of the hydraulic ram assembly of FIG. 17 at the end of its pull stroke.

FIG. 17 depicts the hydraulic ram assembly 82 as it is being configured in the pull position, and FIG. 18 depicts the hydraulic ram assembly 82 and main shaft 34 at the end of the pull stroke of the hydraulic cylinders 84, wherein the main shaft 34 assumes a final position in the bedplate 40 corresponding to FIG. 4 where the main bearing assembly 46 is seated at its operation position within the bedplate 40. At this point, the hydraulic ram assembly 82 can be dismantled from the main shaft 34 and the support elements 90 removed.

The assist motive system is illustrated in the figures as the hydraulic ram assembly 82 for illustrative purposes only. As mentioned, the assist system may be any one or combination of an electrical, hydraulic, pneumatic, or electro/hydraulic system configured in a push mode at the downwind end of the main shaft.

An embodiment of the means used to extend the cylindrical profile of the main shaft 34 to ensure that the end of the main shaft 34 remains fully supported by the bearing unit 48 at the downwind end 44 of the bedplate 40 until load is transferred fully to the crane 78 is the support elements 90 discussed above and depicted in greater detail in FIGS. 9 through 12.

FIG. 9 depicts an embodiment of a main shaft 34 with a main bearing assembly 46 fitted thereon adjacent the upwind end thereof. At the downwind end 44 it can be seen that the main shaft 34 tapers radially inward just aft of the bearing surface 91 that engages the bearing unit 48 when the main shaft 34 is configured in the bedplate 40. Without the support elements 90 fitted onto this section of the main shaft 34, when the bearing surface 91 is pushed past the bearing unit 48, the shaft would "drop" to a certain degree onto the radially reduced aft section and cant to a non-horizontal orientation within the bedplate 40, making further removal of the mains shaft difficult. The opposite action would occur upon installation of the shaft without the support elements 90.

The support elements 90 essentially define an extension 92 (FIG. 10) along the radially reduced aft section of the main shaft 34 that ensures the end of the main shaft 34 remains fully supported on the bearing unit 48 in a horizontal orientation of the main shaft 34 until the full load of the mains shaft 34 and main bearing assembly 46 is borne by the rigging system 70 and crane 78. This extension 92 may be, for example, a full cylindrical extension that completely encircles the main shaft 34, or a partial semi-circular extension around a bottom portion of the main shaft 34. The extension 92 may have a continuous surface, or a discontinuous surface (e.g., a cage-like structure). The extension could be defined by one or more axially extending planks or strip members. It should be appreciated that various support element 90 designs can be configured to meet the need for supporting the end of the main shaft 34 on the bearing unit 48. The cylindrical support elements 90 and full cylindrical extension 92 illustrated in the present figures is for illustrative purposes only.

Figure 11:
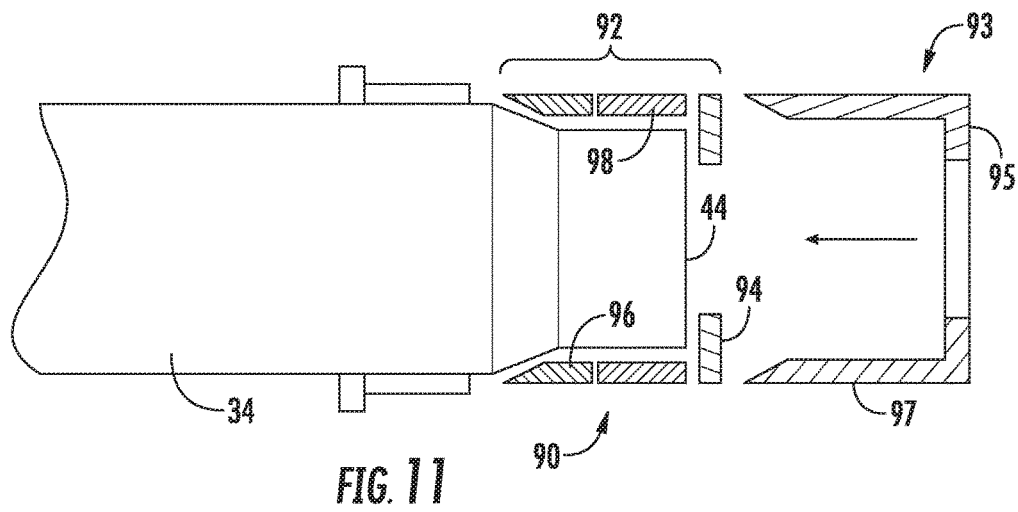
FIG. 11 is a diagram view of a main shaft with support elements to define a cylindrical extension region on the downwind end of the main shaft.
Figure 12:
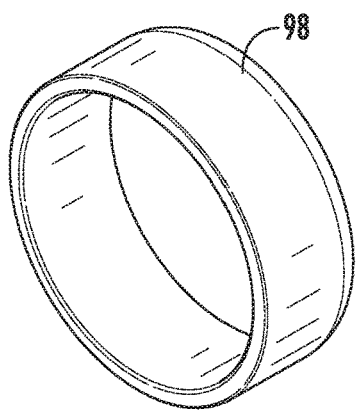
FIG. 12 is a perspective view of the outer ring member of the support elements.
Figure 13:
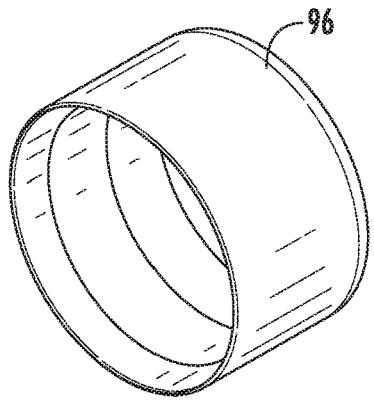
FIG. 13 is a perspective view of the inner ring member of the support elements.
Figure 14:
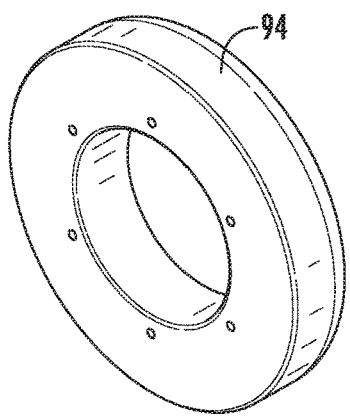
FIG. 14 is a perspective view of the support ring member of the outer support elements.

In the depicted embodiment, the support elements 90 include one or more cylindrical rings 96, 98 that slide onto or are fitted onto the main shaft 34 around the reduced diameter section thereof. For example, an inner support ring 96 (FIGS. 11 and 13) may have a tapered inner diameter (or other non-cylindrical profile) at one end thereof that essentially matches the taper (or other profile) on the main shaft 34, as depicted in FIG. 11, thereby extending the cylindrical extension 92 to include the tapered region of the main shaft 34. An adjacent outer support ring 98 may be fitted onto the shaft 34 and extend essentially to the downwind end 44 thereof.

It should be appreciated that the inner and outer support rings 96, 98 could be replaced by a single ring, a partial arc, or any combination thereof.

The support elements 90 may also include an end support ring 94 (FIGS. 11 and 14) that bolts to the downwind end 44 of the main shaft 34 and extends the cylindrical extension 92 past the downwind end 44, as can be appreciated from FIG. 11. The end support ring 94 may have a diameter that matches the diameter of the main shaft 34 with inner and outer rings 96, 98 fitted thereon.

It should be appreciated that a single support element 90 configured as an end-cap 93 could also serve all of the functions of the rings 94, 96, and 98, as depicted in the alternative in FIG. 11. The end-cap 93 can be formed as an integral or multi-component element with an end ring section 95 and a cylindrical wall section 97.

The various support elements 90 may be formed of a material having a low coefficient of friction, yet sturdy enough to support the main shaft 34 on the bearing unit 48 without significant deformation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for removing an installed main shaft and attached main bearing assembly of a wind turbine from a bedplate in the field, wherein a rotor has been removed from an upwind end of the main shaft, a downwind end of the main shaft has been disconnected from a gearbox, and the gearbox has been removed from the bedplate, the method comprising:

forming an extension onto a downwind end of the main shaft;

supporting the upwind end of the main shaft with a rigging system;

pushing the downwind end of the main shaft partway through the bedplate, wherein the main shaft at the downwind end is supported by the extension on a bearing unit fixed in the bedplate and the main shaft at the upwind end is supported by the rigging system;

with the crane, supporting the main shaft to unload the bearing unit and slide the main shaft until the downwind end is free of the bearing unit;

with the crane fully supporting the main shaft, horizontally sliding the main shaft out from the bedplate.

2. The method of claim 1, wherein the extension is formed by fitting one or more support elements onto the main shaft at the downwind end of the main shaft.

3. The method of claim 2, wherein the one or more support elements are fitted onto a reduced diameter section of the main shaft adjacent the downwind end of the main shaft.

4. The method of claim 3, wherein the one or more support elements comprise at least one full or partial cylindrical ring member slid or fitted onto the reduced diameter section of the main shaft.

5. The method of claim 4, wherein a plurality of the ring members are slid or fitted onto the reduced diameter section of the main shaft.

6. The method of claim 4 wherein the ring member has a tapered inner diameter at an end thereof that matches a taper on the main shaft defining the reduced diameter section of the main shaft.

7. The method of claim 2, further comprising attaching an end support element onto the downwind end of the main shaft to extend the extension axially beyond the downwind end of the main shaft.

8. The method of claim 2, wherein the support element is an end-cap element having an end ring section that extends the extension axially beyond the downwind end of the main shaft and a cylindrical wall section that slides onto the main shaft.

9. The method of claim 8, wherein the cylindrical wall section slides onto a reduced diameter section of the main shaft adjacent to the downwind end of the main shaft.

10. A method for installing a main shaft and attached main bearing assembly for a wind turbine in a in the field, wherein a gearbox has been removed from the bedplate, the method comprising:
forming an extension onto a downwind end of the main shaft intended to be installed;
connecting a rigging system to an upwind end of the main shaft, the rigging system suspended from a crane;
with the crane, fully supporting and moving the main shaft through the bedplate until the extension is positioned at a bearing unit fixed in the bedplate;
transferring load at the downwind end of the main shaft to the extension and bearing unit;
pulling the downwind end of the main shaft until the main bearing assembly is seated in the bedplate; and
removing the rigging system from the upwind end of the main shaft.

11. The method of claim 10, wherein the extension is formed by fitting one or more support elements onto the main shaft at the downwind end of the main shaft.

12. The method of claim 11, wherein the one or more support elements are fitted onto a reduced diameter section of the main shaft adjacent the downwind end of the main shaft.

13. The method of claim 12, wherein the one or more support elements comprise at least one full or partial cylindrical ring member slid or fitted onto the reduced diameter section of the main shaft.

14. The method of claim 13, wherein a plurality of the ring members are slid or fitted onto the reduced diameter section of the main shaft.

15. The method of claim 13, wherein the ring member has a tapered inner diameter at an end thereof that matches a taper on the main shaft defining the reduced diameter section of the main shaft.

16. The method of claim 11, further comprising attaching an end support member onto the downwind end of the main shaft to extend the extension axially beyond the downwind end of the main shaft.

17. The method of claim 11, wherein the support element is an end-cap element having an end ring section that extends the cylindrical extension axially beyond the downwind end of the main shaft and a cylindrical wall section that slides onto the main shaft.

18. The method of claim 17, wherein the cylindrical wall section slides onto a reduced diameter section of the main shaft adjacent to the downwind end of the main shaft.

* * * * *